(12) United States Patent
La Forest et al.

(10) Patent No.: US 7,927,523 B2
(45) Date of Patent: Apr. 19, 2011

(54) DENSIFICATION OF C-C COMPOSITES WITH PITCHES FOLLOWED BY CVI/CVD

(75) Inventors: Mark L. La Forest, Granger, IN (US); Neil Murdie, Granger, IN (US); Allen H. Simpson, Buchanan, MI (US)

(73) Assignee: Honeywell International Inc., Morristown, NJ (US)

( * ) Notice: Subject to any disclaimer, the term of this patent is extended or adjusted under 35 U.S.C. 154(b) by 110 days.

(21) Appl. No.: 12/050,499

(22) Filed: Mar. 18, 2008

(65) Prior Publication Data

US 2009/0238966 A1   Sep. 24, 2009

(51) Int. Cl.
    *C01B 31/00*   (2006.01)
(52) U.S. Cl. .............. 264/29.5; 264/103; 264/171.1
(58) Field of Classification Search ............ 264/29.5, 264/29.1, 66.2, 171.1, 103; 428/408, 66.2
    See application file for complete search history.

(56) References Cited

U.S. PATENT DOCUMENTS

| | | |
|---|---|---|
| 4,178,413 A | 12/1979 | DeMunda |
| 5,061,414 A | 10/1991 | Engle |
| 5,217,657 A | 6/1993 | Engle |
| 5,398,784 A | 3/1995 | Haneda et al. |
| 6,077,464 A | 6/2000 | Murdie et al. |
| 6,323,160 B1 | 11/2001 | Murdie et al. |
| 6,342,171 B1 | 1/2002 | Murdie et al. |
| 6,699,427 B2 | 3/2004 | Huang et al. |
| 7,252,499 B2 | 8/2007 | LaForest et al. |
| 2004/0017019 A1 | 1/2004 | Huang et al. |
| 2004/0105969 A1 | 6/2004 | Huang et al. |
| 2004/0155382 A1 | 8/2004 | Huang et al. |
| 2005/0266220 A1 | 12/2005 | La Forest et al. |
| 2005/0274581 A1 | 12/2005 | Huang et al. |
| 2006/0151912 A1 | 7/2006 | Bauer |
| 2006/0261504 A1* | 11/2006 | Simpson et al. ............ 264/29.1 |

FOREIGN PATENT DOCUMENTS

| | | |
|---|---|---|
| EP | 1 724 245 A | 11/2006 |
| WO | WO-2005/116476 A | 12/2005 |
| WO | WO-2005/121592 A1 | 12/2005 |
| WO | WO-2006/086167 A1 | 8/2006 |

* cited by examiner

*Primary Examiner* — Christina Johnson
*Assistant Examiner* — Larry Thrower
(74) *Attorney, Agent, or Firm* — Shumaker & Sieffert, P.A.

(57) ABSTRACT

Method of manufacturing pitch-based carbon-carbon composite useful as a brake disc, by: (a) providing annular carbon fiber brake disc preform; (b) heat-treating the carbon fiber preform; (c) infiltrating the carbon fiber preform with pitch feedstock by VPI or RTM processing; (d) carbonizing the pitch-infiltrated carbon fiber preform; (e) repeating steps (c) and (d) to achieve a density in the carbon fiber preform of approximately 1.5 g/cc to below 1.7 g/cc; and (f) densifying the preform by CVI/CVD processing to a density higher than 1.7 g/cc. Employing lower cost VPI and/or RTM processing in early pitch densification cycles and using more expensive CVI/CVD processing only in the last densification cycle provides C-C composites in which the pitch-based components resist pullout, resulting in a longer wearing composite.

9 Claims, 1 Drawing Sheet

DENSIFICATION OF C-C COMPOSITES WITH PITCHES FOLLOWED BY CVI/CVD

FIELD OF THE INVENTION

This invention relates to the manufacture of pitch-based carbon-carbon composites useful as friction materials. A preferred embodiment of the present invention is an aircraft brake disc made from a carbon fiber preform that has been densified with pitch.

BACKGROUND OF THE INVENTION

Carbon-carbon composites which have been densified with pitches and used as friction materials typically exhibit higher wear rates compared with carbon-carbon composite that have been densified by CVI/CVD processing. The higher wear rate of C-C composites comprised of pitch matrices results in the friction materials having to be replaced on a more frequent basis, which has a negative impact on operating costs for the end user.

A series of patent publications by Huang et al. are direct to the manufacture of carbon composites wherein carbon preforms are subjected to one or two infiltration cycles using pitch or other carbonaceous materials to fill voids in the composite. See US 2005/0274581; US 2004/0105969; US 2004/0155382; US 2004/0017019; and U.S. Pat. No. 6,699,427.

Murdie et al. disclose the formation of carbon composite articles. U.S. Pat. No. 6,323,160. The Murdie disclosure deals with densification of carbon preforms by various known techniques, including CVD, CVI, and pitch impregnation followed by carbonization. Murdie et al. teach that combinations of these techniques are often used to make a final product. See column 10, lines 34 and following.

U.S. Pat. Nos. 5,061,414 and 5,217,657 (Engle) disclose a method of making carbon-carbon composites from a pitch-impregnated preform followed by carbonization, with further pitch-impregnation steps with heat treatments between each impregnation, followed by CVD.

SUMMARY OF THE INVENTION

This invention provides a method of manufacturing a pitch-based carbon-carbon composite useful as a brake disc. The method includes sequential steps (a) through (f), as follows. Step (a) involves providing an annular carbon fiber brake disc preform. Step (b) involves heat-treating the carbon fiber preform at 1200-2540° C.

Step (c) involves infiltrating the carbon fiber preform with a pitch feedstock by vacuum pressure infiltration (VPI) or resin transfer molding (RTM) processing. In step (c), the carbon fiber brake disc preform may be densified with synthetic, coal tar, or petroleum derived mesophase pitch to a density of approximately 1.1-1.5 grams per cubic centimeter by VPI or RTM processing, or the carbon fiber brake disc preform may be densified with a low cost, synthetic, coal tar, or petroleum derived, isotropic pitch having a low to medium char yield to a density of approximately 1.1-1.3 grams per cubic centimeter in step (c) by VPI or RTM processing.

Step (d) involves carbonizing the pitch-infiltrated carbon fiber preform at 1200-2200° C. in an inert atmosphere. Step (d) may include an optional stabilization step prior to carbonization to rigidize the pitch and prevent exudation from the preform during carbonization. The optional stabilization step may be oxidative stabilization carried out at a temperature of about 150-250° C. to prevent pitch exudation. Alternatively, pressure and a can may be used to prevent and contain any pitch exudation during carbonization. Step (d) may include an optional machining step after carbonization to enhance surface porosity in surface areas of the preform.

"Step (e)" involves the repetition of steps (c) and (d) a sufficient number of times to achieve a density in the carbon fiber preform of approximately 1.5 g/cc to below 1.7 g/cc.

Step (f) involves densifying the preform by chemical vapor deposition (CVD) or chemical vapor infiltration (CVI) to a density higher than 1.7 g/cc. The pitch used in step (f) may be a high cost mesophase material (synthetic, coal tar, or petroleum derived) or an isotropic, low to medium char yield pitch (synthetic, coal tar, or petroleum derived), or step (f) may use a combination of these isotropic and mesophase pitches. The C-C composite densified by CVI/CVD processing in step (f) may have: (i.) a rough laminar microstructure and be densified at a temperature of 1275° C., a pressure of 210 Torr, and a C/H ratio of 1/4; (ii.) a smooth laminar microstructure and be densified at a temperature of 1200° C., a pressure of 630 Torr, and a C/H ratio of 1/4; or (iii.) an isotropic microstructure and be densified at a temperature of 1425° C., a pressure of 630 Torr, and a C/H ratio of 1/4. The densified annular carbon-carbon composite brake disc preform resulting from step (f) may be subjected to a final heat-treatment at 1200-2540° C., typically at a temperature between about 1400 and 2540° C. in an inert nitrogen atmosphere or in a vacuum.

DETAILED DESCRIPTION OF THE INVENTION

Figure 1:
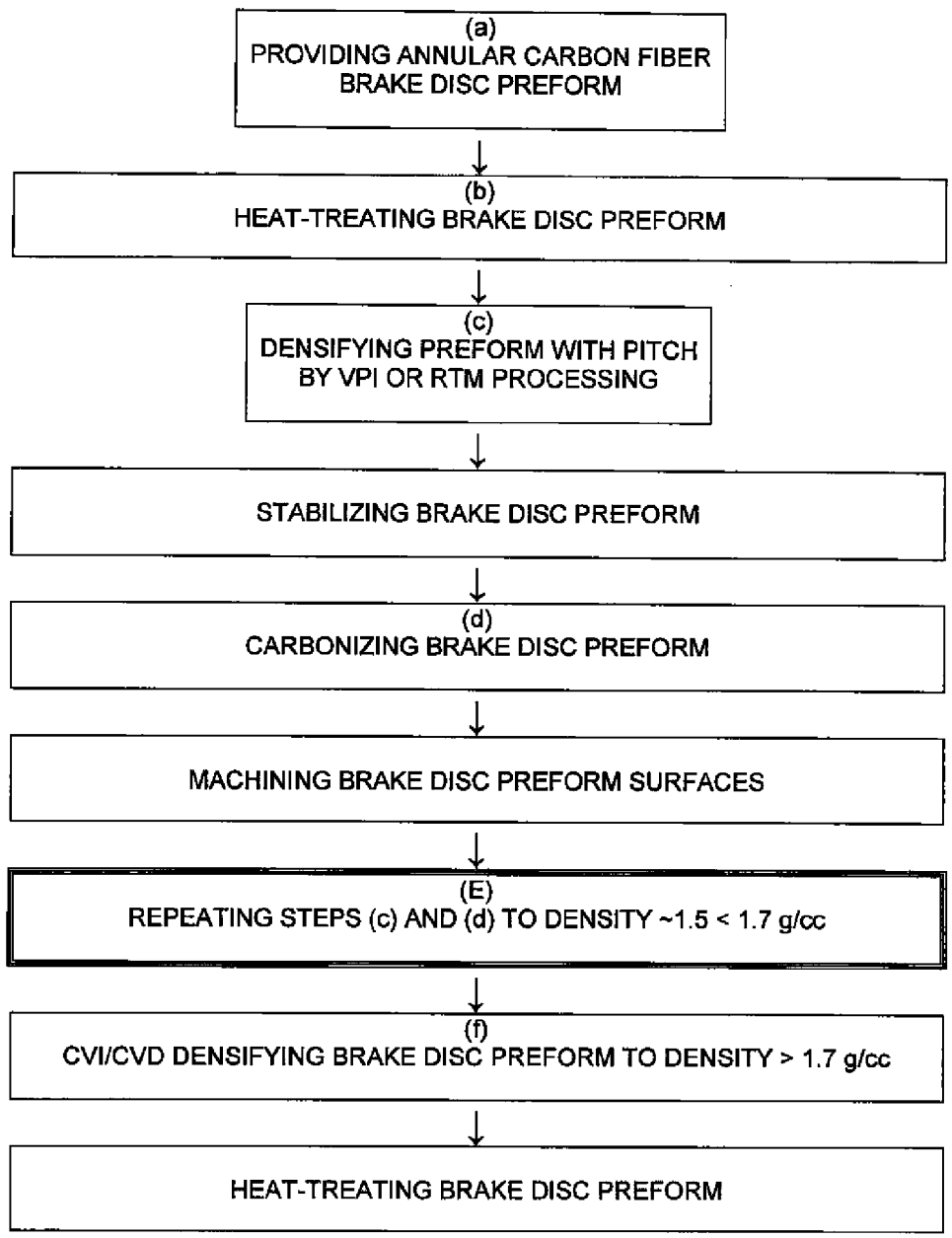
FIG. 1 is a flowchart depicting the sequential processing steps of the present invention.

The present invention describes a precise sequence of processing steps used to manufacture C-C composite friction materials with improved friction and wear performance. In accordance with the present invention, the addition of a final CVI/CVD densification step following multiple cycles of pitch densification via VPI or RTM reduces the wear rate of the friction material. The final CVD/CVI step serves to improve the binding of the pitch matrix throughout the composite, and helps to reduce the amount of fiber and matrix pull-out during the friction process, resulting in a reduction to the wear rate of the composite.

This invention employs the following sequential steps:
(a) providing an annular nonwoven or chopped carbon fiber brake disc preform;
(b) heat-treating the carbon fiber preform at 1200-2540° C.;
(c) infiltrating the carbon fiber preform with a low-to-medium char yield isotropic pitch (coal tar, petroleum, or synthetic) or a high char yield mesophase pitch by vacuum pressure infiltration (VPI) or resin transfer molding (RTM) processing;
(d1) an optional stabilization step prior to carbonization to rigidize the pitch and prevent exudation from the preform during carbonization, which step comprises heating the preform in air at 150-250° C.;
(d2) carbonizing the pitch-infiltrated carbon fiber preform at 1200-2200° C. in an inert atmosphere;
(d3) an optional machining step after carbonization to grind the surfaces of the preform (using standard grinding equipment), thereby opening surface porosity in the preform;

(e) repeating steps (c) and (d) to achieve a density in the carbon fiber preform of approximately 1.5 g/cc to below 1.7 g/cc; and (f) densifying the preform by chemical vapor deposition (CVD) or chemical vapor infiltration (CVI) to a density higher than 1.70 g/cc.

Subsequent to the above steps, the dense annular carbon-carbon composite brake disc preform resulting from step (f) may be subjected to a final heat-treatment at 1200-2540° C. It will also normally be subjected to additional conventional processing steps, including final machining and treatment with antioxidant solutions.

The present invention makes use of processing modules which are known in themselves. The advantages provided by the present invention lie in the selection and ordering of known processing modules to improve the friction and wear performance of the C-C composite brake discs prepared in accordance with this invention as compared with standard brake discs which have been desified by pitch-infiltration processing. This invention reduces the wear rates of C-C composite friction materials by applying a final CVI/CVD cycle following multiple pitch infiltrations. The final CVI/CVD step also improves the strength and oxidation resistance by improving bonding of the matrix throughout the composite. The present invention likewise improves the economics of disc manufacture. Various "modules" which may be used in accordance with the present invention are summarized below.

Heat treatment. Intermediate and/or final heat treatment of the preforms is usually applied to modify the crystal structure and order of the carbon. Heat treatment is employed to modify the mechanical, thermal, and chemical properties of the carbon in the preform. Heat treatment of the preforms may be conducted in the range of 1600° to 2800° C. The effect of such a treatment on graphitizable materials is well known. Higher temperatures increase the degree of order in the material, as measured by such analytical techniques as X-ray diffraction or Raman spectroscopy. Higher temperatures also increase the thermal conductivity of the carbon in the products, as well as the elastic modulus.

VPI. Vacuum Pressure Infiltration ("VPI") is a well known method for impregnating a resin or pitch into a preform. The preform is heated under inert conditions to well above the melting point of the impregnating pitch. Then, the gas in the pores is removed by evacuating the preform. Finally, molten pitch is allowed to infiltrate the part, as the overall pressure is returned to one atmosphere or above. In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches provide lower carbon yields than do mesophase pitches. Accordingly, at least one additional cycle of pitch infiltration of low or medium char-yield pitch (with VPI or RTM processing) is usually required to achieve a final density of 1.7 g/cc or higher.

Carbonization The carbonization process is generally well known to those skilled in the art. The CVD/resin/pitch-infiltrated fiber preforms are heated in a retort under inert or reducing conditions to remove the non-carbon constituents (hydrogen, nitrogen, oxygen, etc.) from the fibers and matrix carbons. This process may be performed, for instance, by burying the foam preforms in a bed of activated carbon, enclosed in a superalloy retort with a sand seal. Carbonization of the infiltrated pitch can be carried out either in a furnace, a hot isostatic press, an autoclave, or in a uniaxial hot press. In each of these techniques, the impregnated part is heated to the range of 600° to about 1000° C., while maintaining an inert atmosphere in the pressure range of 1 to 1000 atmospheres. In one approach, for instance, the retort is purged gently with nitrogen for approximately 1 hour, then it is heated to 900° C. in 10-20 hours, and thence to 1050° C. in 1-2 hours. The retort is held at 1050° C. for 3-6 hours, then allowed to cool overnight. Carbonization can be carried out up to 1800° C. The higher the pressure, the higher the carbon yield achieved, although the biggest gains in carbon yield are achieved at moderate pressures up to 5000 psi.

Machining the surfaces of the preform. Standard machining processes, well know to persons skilled in the art of manufacturing carbon-carbon composite brake discs, are used in the manufacture of the carbon-carbon composite friction discs provided by the present invention. Between densification processing steps, the surfaces of the annular discs are ground down to expose porosity in the surfaces. Once the final density is achieved, the annular discs are ground to their final thickness using standard grinding equipment to provide parallel flat surfaces, and then the inside diameter and outside diameter regions are machined, typically using a CNC (computer numerical control) Mill to provide the final brake disc geometry, including such features as rivet holes and drive lugs.

CVD/CVI. Chemical vapor deposition (CVD) of carbon is also known as chemical vapor infiltration (CVI). In a CVD/CVI process, carbonized, and optionally heat treated, preforms are heated in a retort under the cover of inert gas, typically at a pressure below 100 torr. When the parts reach a temperature of 900° to 1200° C., the inert gas is replaced with a carbon-bearing gas such as methane, ethane, propane, butane, propylene, or acetylene, or combinations of these gases. When the hydrocarbon gas mixture flows around and through the porous structures, a complex set of dehydrogenation, condensation, and polymerization reactions occur, thereby depositing the carbon atoms within the interior and onto the surface of the porous structures. Over time, as more and more of the carbon atoms are deposited onto the structures, the porous structures become more dense. This process is sometimes referred to as densification, because the open spaces in the porous structures are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. US 2006/0046059 A1 (Arico et al.), the disclosure of which is incorporated herein by reference, provides an overview of CVD/CVI processing.

EXAMPLES

With the present invention, there are several process options available including variations in: the type of pitch used (isotropic coal tar or petroleum vs. mesophase pitch); the method of infiltration (VPI vs. RTM); the carbonization temperature; and the final heat treatment temperature, etc. A preferred embodiment of this invention would include: carbonization of the carbon fiber preform to 1800° C.; densifying the preform first with AR synthetic pitch by RTM to provides a uniform microstructure at the fiber-matrix interfaces throughout the thickness of the composite; stabilizing the mesophase pitch-infiltrated preform by heating in air between 150 and 190° C.; performing subsequent pitch densification cycles with isotropic coal tar pitch by VPI to provide an economical method to achieve a final density greater than 1.7 g/cc; final CVD densification to bond the pitch matrix into the carbon-carbon composite; and final heat treatment at 2000° C.

The Table below shows some of the options that can be used to provide a low cost densification process with improved friction and wear performance in accordance with the present invention.

| Preform | Carbonization | 1st Dens. | Stabilization | Carbonization | 2nd Dens. | Carbonization | 3rd Dens. |
|---|---|---|---|---|---|---|---|
| Nonwoven | 1600° C. | Mesophase pitch/RTM | 170° C. | 2000° C. | Isotropic coal tar pitch/RTM | 1600° C. | CVI-Rough Laminar |
| Random Fiber | 2000° C. | Mesophase pitch/VPI | N/A | 1800° C. | Isotropic coal tar pitch/VPI | 2200° C. | CVI Isotropic |
| Non woven | 1200° C. | Isotropic pitch/RTM | 180° C. | 1600° C. | Isotropic coal tar pitch/VPI | 1600° C. | CVI smooth laminar |
| Random fiber | 1600° C. | Mesophase pitch/VPI | 160° C. | 1400° C. | Isotropic coal tar pitch/RTM | 1600° C. | CVI-Rough Laminar |
| Nonwoven | 2000° C. | Mesophase pitch/VPI | N/A | 2200° C. | Isotropic coal tar pitch/RTM | 1800° C. | CVI smooth laminar |
| Random fiber | 1400° C. | Mesophase pitch/VPI | 190° C. | 2540 C. | Isotropic coal tar pitch/VPI | 1800° C. | CVI Isotropic |
| Nonwoven | 2540° C. | Mesophase pitch/VPI | N/A | 1200 C. | Isotropic coal tar pitch/RTM | 1600° C. | CVI Rough Laminar |

INDUSTRIAL APPLICABILITY

In terms of manufacturing economics, the hybrid composite concept embodied in the present invention enables the use of low cost pitch materials and processes to be combined with only one cycle of CVI/CVD and its associated high cost of capitalization to provide C-C composite friction materials with improved friction and wear performance at lower cost.

What is claimed is:

1. A method of manufacturing a pitch-based carbon-carbon composite useful as a brake disc, comprising the following sequential steps:
   (i) providing an annular carbon fiber brake disc preform comprising a nonwoven fabric;
   (ii) heat-treating the carbon fiber preform at 1200-2540° C.;
   (iii) densifying the preform by infiltrating the carbon fiber brake disc preform with mesophase pitch to a density of 1.1 g/cc to 1.5 g/cc by resin transfer molding (RTM) processing, followed by carbonizing the pitch-infiltrated carbon fiber preform at 1200-2200° C. in an inert atmosphere;
   (iv) densifying the preform by infiltrating the carbon fiber brake disc preform with low cost, isotropic pitch having low to medium char yield by VPI processing, followed by carbonizing the pitch-infiltrated carbon fiber preform at 1200-2200° C. in an inert atmosphere to achieve a density in the carbon fiber preform of 1.5 g/cc to below 1.7 g/cc; and
   (v) densifying the preform by a single cycle of chemical vapor deposition (CVD) or chemical vapor infiltration (CVI) to provide a C-C composite which: (i.) has a rough laminar microstructure and is densified at a temperature of 1275° C., a pressure of 210 Ton, and a C/H ratio of 1/4; (ii.) has a smooth laminar microstructure and is densified at a temperature of 1200° C., a pressure of 630 Torr, and a C/H ratio of 1/4; or (iii.) has an isotropic microstructure and is densified at a temperature of 1425° C., a pressure of 630 Ton, and a C/H ratio of 1/4, wherein said C-C composite has a density higher than 1.7 g/cc.

2. The method of claim 1, wherein a carbonization step includes a stabilization step prior to carbonization to rigidize the pitch and prevent exudation from the preform during carbonization.

3. The method of claim 1, wherein a carbonization step includes a machining step after carbonization to enhance surface porosity in surface areas of the preform.

4. The method of claim 1, further comprising subjecting the dense annular carbon-carbon composite brake disc preform resulting from step (v) to a final heat-treatment at 1200-2540° C.

5. The method of claim 1, where the mesophase pitch used in step (iii) is synthetic, coal tar, or petroleum derived.

6. The method of claim 1, where the isotropic pitch used in step (iv) is synthetic, coal tar, or petroleum derived.

7. The method of claim 4, wherein a final heat-treatment step is carried out at a temperature between about 1400 and 2540° C. in an inert nitrogen atmosphere or in a vacuum.

8. The method of claim 2, wherein the stabilization step is oxidative stabilization carried out at a temperature of about 150-250° C. to prevent pitch exudation.

9. The method of claim 1, wherein pressure and a can are used to prevent and contain any pitch exudation during carbonization.

* * * * *

UNITED STATES PATENT AND TRADEMARK OFFICE
CERTIFICATE OF CORRECTION

| | | |
|---|---|---|
| PATENT NO. | : 7,927,523 B2 | Page 1 of 1 |
| APPLICATION NO. | : 12/050499 | |
| DATED | : April 19, 2011 | |
| INVENTOR(S) | : Mark L. La Forest et al. | |

It is certified that error appears in the above-identified patent and that said Letters Patent is hereby corrected as shown below:

Col. 6, Line 5 (Claim 1), "a pressure of 210 Ton" should be --a pressure of 210 Torr:--

Col. 6, Line 40 (Claim 1), "pressure of 630 Ton" should be --pressure of 630 Torr--

Signed and Sealed this
Fifteenth Day of May, 2012

David J. Kappos
*Director of the United States Patent and Trademark Office*